United States Patent [19]
Miller et al.

[11] Patent Number: 5,621,762
[45] Date of Patent: Apr. 15, 1997

[54] RADIO WITH PEAK POWER AND BANDWIDTH EFFICIENT MODULATION

[75] Inventors: Scott L. Miller, Gainesville; Robert J. O'Dea, Ft. Lauderdale, both of Fla.

[73] Assignee: Motorola, Inc., Schaumburg, Ill.

[21] Appl. No.: 489,630

[22] Filed: Jun. 12, 1995

[51] Int. Cl.$^6$ .................................................. H04L 27/36
[52] U.S. Cl. .......................... 375/298; 375/295; 332/103
[58] Field of Search .................................... 375/260, 261, 375/295, 297, 298; 332/103

[56] References Cited

U.S. PATENT DOCUMENTS

| | | | |
|---|---|---|---|
| 5,164,963 | 11/1992 | Lawrence et al. | 375/261 |
| 5,282,226 | 1/1994 | Critchlow | 375/295 |
| 5,381,449 | 1/1995 | Jasper et al. | 375/298 |
| 5,394,440 | 2/1995 | Goldstein et al. | 375/295 |
| 5,406,588 | 4/1995 | Birchler et al. | 375/346 |

*Primary Examiner*—Stephen Chin
*Assistant Examiner*—T. Ghebretinsae
*Attorney, Agent, or Firm*—M. Mansour Ghomeshi

[57] ABSTRACT

A communication device (300) includes a digital modulator (301), a Digital Signal Processor (306), and an amplifier (312). The digital modulator (301) includes an information generator (304) and a peak suppression device (402). The peak suppression device (402) includes a symbol mapper (404) and a symbol scaler (406). The information generated by the generator (401) are mapped on a constellation diagram via the symbol mapper (404). The mapped information is then scaled at the scaler (406) in order to reduce the peak-to-average ratio of the signal at the input to the amplifier (312).

25 Claims, 3 Drawing Sheets

RADIO WITH PEAK POWER AND BANDWIDTH EFFICIENT MODULATION

TECHNICAL FIELD OF THE INVENTION

This invention is generally related to communication devices and more particularly to communication devices with efficient modulation.

BACKGROUND OF THE INVENTION

In one dimensional digital communication systems the transmitted waveform is formed by adding time-shifted versions of a basic pulse shape. The amplitude of this pulse is adjusted according to the data being sent (e.g. binary phase shift keyed). In multi-dimensional digital communication systems (e.g. Quadrature Amplitude Modulated) multiple pulse streams are generated according to the data. To minimize the bandwidth of the transmitted waveform and thereby secure that the transmitted waveform does not interfere with other systems operating in a nearby (frequency) channel, the pulse shape used must have a time duration which spans several symbol intervals. That is the pulse associated with one data symbol will overlap pulses associated with adjacent data symbols. Certain data sequences will cause these overlapping pulses to add constructively producing large peaks in the transmitted waveform, while other data sequences will cause these overlapping pulses to cancel one another producing small values of the transmitted waveform. Amplifiers that are used to boost the power of the transmitted signal just prior to transmission work best when the signal remains at a fairly constant level. Large peaks in the transmitted signal lead to inefficient usage of the power amplifier which in turns wastes precious battery life.

Battery operated communication devices employ a variety of techniques to save battery energy in order to prolong the operating life of the battery. Increasing the efficiency of power amplifiers is one technique that designers utilize to prolong the operating life of a communication device. Another scheme by which battery energy may be saved is the use of another power-efficient modulation technique. Various modulation techniques have different associated peak-to-average power ratios. In general, it is highly desirable to have a peak-to-average ratio as close to zero dB as possible. However, many existing modulation formats result in relatively high peak-to-average power ratios. Two commonly used modulation formats are Phase Shift Keying (PSK) and Quadrature Amplitude Modulation (QAM). The former uses a signal constellation where all data symbols have the same magnitude while the latter varies both the phase and magnitude of the individual data symbols. Binary signaling is a special case of PSK (i.e. BPSK). In both modulation formats, the peak-to-average ratio depends upon the pulse shape used.

Quadrature Amplitude Modulation (QAM) utilizes both the phase and amplitude of a carrier to transmit information and hence has the potential to generate a higher peak-to-average power ratio. Indeed, experiments have demonstrated that, for example, a sixteen symbol PSK constellation enjoys a 3–4 dB improvement in peak-to-average power ratio over a 16 QAM signal. However, this gain in efficiency improvement is accompanied with a 4 dB loss in sensitivity. Due to this loss of sensitivity, many system designers prefer to use the QAM modulation format despite its degraded peak-to-average power ratio.

Referring to FIG. 1, a communication device is shown as is presently available. FIG. 2 shows a phase and magnitude trajectory of a complex baseband 8 PSK signal. In other words, this figure represents the transition from one symbol to the next as the generated data changes state. A filter that is used to limit the sideband noise produces undesirable overshoot as shown by reference 202. This overshoot 202 contributes to an increase in peak power which results in an increase in the peak-to-average power ratio. This increase in the peak-to-average power ratio forces a designer to design an amplifier that can tolerate the maximum peak power which in turn renders the power amplifier more expensive to produce. In addition, the increase in peak-to-average ratio reduces the power efficiency of the power amplifier.

In the design of portable communication devices, the aim of a designer is to utilize efficient components at the lowest possible price. Power amplifiers have traditionally been some of the most expensive components of a communication device and have often resisted attempts aimed at lowering their cost. One parameter that is directly related to the cost of amplifiers is the peak-to-average power ratio. This is because the designer is forced to employ an amplifier that can handle peak powers significantly larger than the average power. It has therefore been the goal of designers to reduce peak-to-average power ratios as much as possible without degrading other performance parameters. There is therefore a need for a modulation scheme that would have minimum peak-to-average power ratio without suffering other performance degradation.

DETAILED DESCRIPTION OF THE PREFERRED EMBODIMENT

Figure 1:
FIG. 1 shows a block diagram of relevant elements of a communication device as is presently available.
Figure 2:
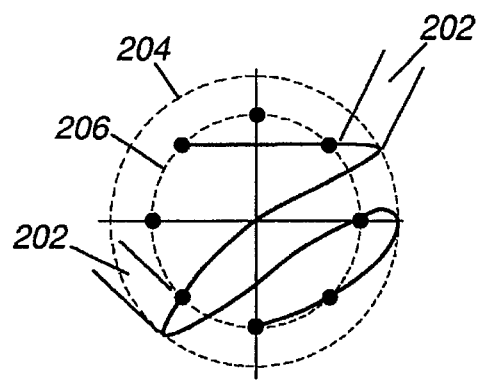
FIG. 2 shows the magnitude and phase trajectory of a complex baseband signal of the communication device of FIG. 1.
Figure 3:
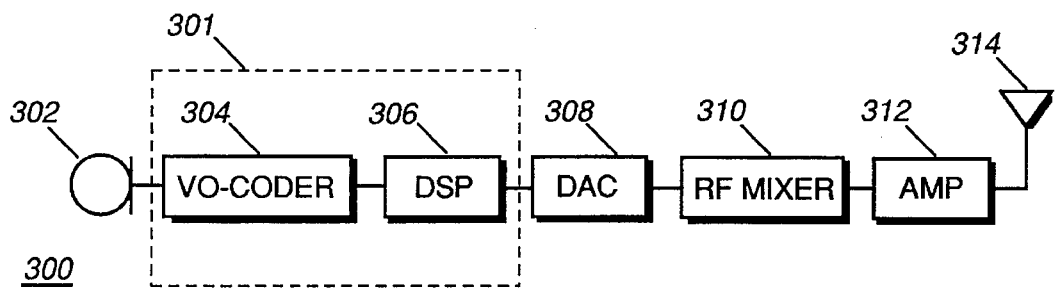
FIG. 3 shows relevant portions of a communication device in accordance with the present invention.

Referring to FIG. 3, relevant components of a communication device 300 in accordance with the present invention are shown. A microphone 302 produces an analog signal which is coupled to a vo-coder 304 where it is converted to a digital signal. The vo-coder 304 generates a digital information signal and applies it to a Digital Signal Processor (DSP) 306. The combination of the vo-coder 304 and the DSP 306 form a digital modulator 301. The DSP 306 manipulates this digital information signal in accordance with the principles of the present invention. In addition to making peak and instantaneous power measurements, keeping track of the time that such peaks occur and combining the I and Q components; which methods are known in the art, the DSP 306 performs signal scaling. More details of the operation of the DSP 306 will be discussed in association with FIG. 4. The processed signal at the output of the DSP 306 is coupled to a digital to analog converter 308 where the signal is converted back to analog before being applied to an RF mixer 310. This mixer 310, which could be a quadrature mixer, mixes the analog signal with a locally generated oscillator signal (LO). The output of the mixer is coupled to an amplifier 312 which amplifies the mixed signal before it is transmitted via an antenna 314.

Figure 4:
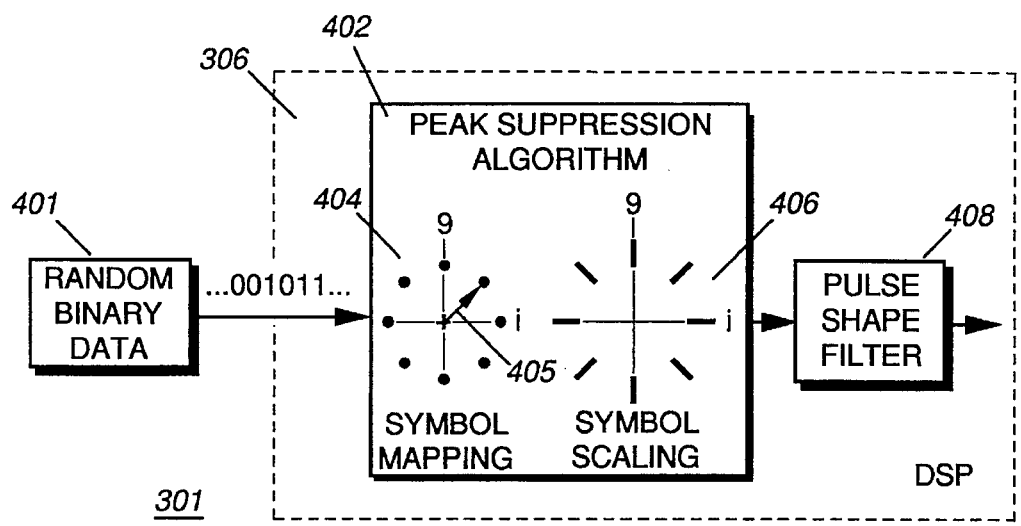
FIG. 4 shows the elements of a peak suppression algorithm in accordance with the present invention.

Referring to FIG. 4, essential elements of the DSP 306 in accordance with the present invention are shown. In essence, a random binary data generator 401 is shown coupled to a peak suppression algorithm 402. The generator 401 may be any source of digital data such as the vo-coder 304. The peak suppression algorithm includes a symbol mapping section 404 and a symbol scaling section 406. The digital information generated at 401 is mapped onto a constellation diagram 404 to produce data symbols each having a symbol interval and an onset. These data symbols are represented via vectors 405 each having I and Q signal components. In other words, the data symbols are represented by vector components with orthogonal relationships. It is noted that the peak suppression algorithm can also operate on one-dimensional signals (e.g. BPSK). The I and Q signal components collectively represent the magnitude and the phase of the vector 405. Each vector represents a symbol interval whose content is determined by the number of bits that are processed at each instant of time. Indeed, the data symbols are processed at a rate which separates them at their respective onset via a symbol interval. For instance, in a three bit system, the vector 405 represents three bits with eight distinct possibilities. In a four bit system, a vector represents four bits and the signal constellation has sixteen symbol locations thereon. In the preferred embodiment and in order to facilitate the understanding of the principles of the present invention, a three bit symbol interval is assumed.

Once the symbols have been mapped a symbol scaling process is embarked upon. As part of this process the magnitudes of the I and Q components are altered according to an algorithm that would minimize overshoot at the subsequent filtering step. This step is performed via a pulse shape filter 408. The aim of this filter is to reduce high frequency components of the symbols before they are transmitted. Due to its characteristics, however, this filter tends to produce signal peaks during transitions from one symbol to another. These signal peaks translate into additional peak power demanded from the amplifier 312. The magnitude of these peaks depends on both the sequence of the symbols and the filter characteristics. The present invention seeks to adjust or scale these vectors (i.e. 405) in such a fashion as to compensate or reduce the signal peaks. This compensation relieves the amplifier from having to operate at unnecessary peaks while maintaining system integrity.

The scaling of the data symbols may be implemented solely in the magnitude or both magnitude and phase. In other words, the amplitude of the I and Q components may be altered in such a way to maintain the phase of the vector 405 constant. Alternatively, the amplitude of the I and Q components may be altered independently thereby resulting in changes to both the magnitude and the phase of the vector 405.

Figure 5:
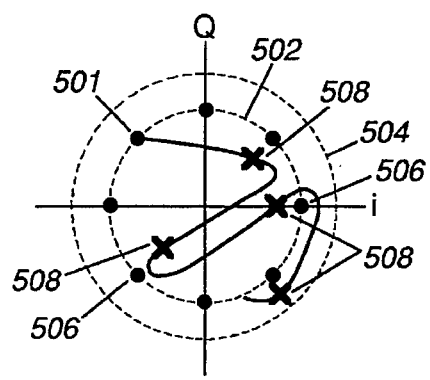
FIG. 5 shows the magnitude and phase trajectory of a complex baseband signal in accordance with the present invention.

The magnitude of the unscaled symbols on FIG. 5 are shown via the dotted line circle 502. This circle represents the magnitude of the symbols as they are generated by the random binary data generator 401 and symbol mapper 404. Ideally, the amplifier 312 will have to amplify these constant magnitude signals. But due to the pulse shape filter 408 these signal magnitudes are increased to the point where the concentric circle 504 is formed at the output of the pulse shape filter. This external circle 504 shows the extent of the overhead placed on the amplifier 312. Indeed, the diametric distance between the two concentric circles 502 and 504 represents the magnitude difference between unfiltered and filtered symbols. This difference is directly translated in undesirable peak power. The scaling of the symbols amounts to a shrinking of the diameter of this circle hence a lower peak demand on the amplifier 312.

The scaling algorithm looks at the sequence of symbols and determines the alteration needed on each of the symbols as they are generated by the data generator 401. The algorithm utilizes the filter characteristics during this determination. FIG. 5 shows a phase and magnitude trajectory of several symbols after they have been scaled. Unscaled symbols are represented by 506 while their scaled counterparts are shown via 508. In this example we assume that five symbols are transmitted. The first symbol 501 is unaltered for there is no peak generated. The next symbol is scaled radially downward to prevent the signal peak which would normally result due to the interaction between the time delayed filtered symbols. The third symbol is similarly scaled down to avoid a signal peak magnitude. The fourth is similarly scaled down. The fifth symbol is scaled up due to the small signal magnitude that occurs during the transition from the fourth symbol thereto. The symbol scaling is accomplished in a manner that maintains the symbol integrity and prevent the loss of information.

The peak suppression algorithm determines the instantaneous power of the baseband signal during each symbol interval. The scaling of the signal will directly follow from the determination of the peak power and its time location on the symbol interval. Under these circumstances, the average power associated with the baseband signal is also determined. With the peak power information available the algorithm determines the time at which the peak power of the composite baseband signal occurs. Next, the I and Q components of the symbol associated with adjacent symbol intervals are altered. The amplitude of these components may be radially scaled equally at which time only the magnitude of the composite signal is varied. Independent and unequal scaling of the I and Q signal is also possible which would result in scaling of the phase and magnitude of the composite signal.

In summary, digital data symbols generated by the vo-coder 304, and the symbol mapper 404 are processed through the peak suppression algorithm 402 in order to take benefit of the principles of the present invention. Data symbols generated as the result of this mapping are represented via their I (In phase) and Q (Quadrature) components. The I and Q components are then dynamically scaled via the symbol scaling portion 406 of the peak suppression algorithm block 402. The scaling of the I and Q components is in anticipation of the filtering action that takes place via the pulse shape filter 408. The symbol scaling simply keeps track of the magnitude and phase trajectory of the baseband signal (constituted by the I and Q components). As was discussed, the problem with the prior art is that the pulse shape filter produces signal peaks during symbol transitions. The present invention provides for a method to minimize this peak signal problem. By scaling the I and Q components of the data symbols, the present invention aims at minimizing the magnitude of the signal peaks, hence reducing the peak power demand on the amplifier 312.

The algorithm used in the preferred embodiment, accepts data symbols that have been produced by the constellation mapper 404, processes the symbols and outputs them to the pulse shape filter 408. Specifically, the algorithm sequentially loads the data symbols into an input data block for iterative processing. Following the completion of processing, the input data block is copied into an output data block and the scaled symbols are sequentially output to the pulse shape filter 408. To maintain a constant symbol rate, newly arriving data symbols are shifted into the vacated input data block while the scaled symbols are being shifted out of the output block. Hence, if the processing time is assumed to be insignificant, the transmission delay created by the algorithm is approximately equal to (block size)/(symbol rate) seconds. The block size must be large enough to guarantee that the symbols within the block accurately represent the statistical characteristics of the total transmitted data symbol sequence.

Upon successful population of the input data symbol block, the algorithm proceeds to determine several values for each symbol interval defined by the input symbol block. These values are: (1) the peak transmitted signal magnitude, (2) the time location of the peak, and (3) the peak scale factor for the peak magnitude. The algorithm determines these values on a symbol interval by applying the pulse shape filter function to the appropriate data symbols. The number of data symbols utilized to calculate the signal over a particular symbol interval depends upon the impulse response of the pulse shape filter function. All symbols that combine with the pulse shape to produce significant signal magnitude within the symbol interval of interest must be included in these calculations. The impulse response of the pulse shape filter 408 also determines how much symbol overlap there must be between successive symbol blocks.

The algorithm utilizes the peak transmitted signal magnitude on a particular symbol interval to determine the peak scale factor for that interval. A peak scale function is applied to the peak signal value. The peak scale function is defined such that it produces a negative peak scale factor if the peak magnitude is greater than some reference value and a positive scale factor if it is less than the reference value. The magnitude of this scale factor increases with the difference between the peak magnitude and the reference value. The reference value is usually set equal to the desired peak magnitude. The algorithm stores the peak scale factor and the corresponding peak time location for each symbol interval in two separate vectors. These values will be subsequently utilized to determine the symbol scale factor for the symbols in the block.

Following the successful determination of the peak scale factors and their associated time locations, the algorithm calculates the symbol scale factor for each of the data symbols. To determine a particular symbol scale factor the algorithm utilizes the peak information from the two symbol intervals that are immediately adjacent to a particular symbol. These two intervals will be referred to as the left-hand and right-hand intervals. The symbol scale function weights the left-hand peak scale factor by the relative time distance that the peak is located from the particular symbol. Likewise, the right-hand peak scale factor is weighted by the relative distance that it is from the particular symbol. The two weighted scale factors are than summed together with a unity value to determine the symbol scale factor. In this manner, signal peaks that are located close to a particular symbol have a greater impact on the scale factor for that symbol.

After each of the symbol scale factors have been determined, the algorithm normalizes the symbol scale factors to maintain the desired average power. Assuming that the pulse shape has unity average energy and that the individual symbols are independent and identically distributed, the average power ($P_s$), is calculated by simply averaging the squared scaled symbol magnitudes. The desired average power is usually equal to the average power of the unscaled transmitted signal ($P_u$). Hence, the normalizing factor is equal to $Sqrt(P_u/P_s)$. In the case of a circular PSK constellation of unity symbol magnitude $P_s$ is simply equal to the average of the symbol scale factors.

The algorithm repeats the symbol processing steps described above for a specified number of iterations or until some target peak-to-average power ratio is attained. After one of these conditions has been met, the algorithm scales the data symbols by the appropriate final symbol scale factors and copies the scaled symbols to the output block. The algorithm then proceeds to sequentially output the scaled symbols to the pulse shape filter while simultaneously loading the input block with the new, unscaled symbols from the constellation mapper.

In an alternative embodiment, the peak suppression algorithm produces an imaginary sphere around each data symbol in order to create a boundary for scaling them. This spherical boundary helps in establishing limits for phase and magnitude movement and scaling. Once again this scaling helps in minimizing the peak power requirement on the amplifier 312.

Simply stated, the scaling algorithm looks at the phase and magnitude of symbols as they are generated by the vo-coder 304 and symbol mapper 404 and estimates the magnitude of the signal peaks (extent of overshoot) that will be at the output of the filter 408. This estimate of the signal peaks is considered in determining the level and direction of scaling that must be implemented on each symbol. In so doing, the I and Q components are presented to the filter 408 with sufficient compensation to minimize the effect of the unavoidable signal peaks. This compensation minimizes the peak power requirement on the amplifier 312. It is appreciated that without the benefit of the present invention, the amplifier 312 must be able to handle the peak power demands as represented by circle 504. This additional requirement greatly increases the cost of the amplifier 312. The increase in the peak power vis-a-vis the average power adversely affects the efficiency of the amplifier 312. Portable radio devices are particularly at a disadvantage in view of this additional degradation in efficiency.

The principles of the present invention provide a general method to suppress peaks in the transmitted waveform before it is amplified. The magnitude of a data symbol is slightly adjusted according to the values of the neighboring symbols and the pulse shape filter response. The result is a transmitted waveform which retains a much more constant magnitude level. The algorithm works on a block of data (usually about 50 to 500 symbols at a time works best). The peak suppression algorithm can be briefly described as follows:

STEP 1: Based on the data symbols for the block, and the pulse shape to be used, construct the transmitted waveform.

STEP 2: For each symbol interval in the transmitted waveform, calculate the peak value of the waveform in that interval, the position of that peak, and the peak scale factor.

STEP 3: Based on the peak scale factors and their positions, rescale the heights of each data symbol.

STEP 4: Repeat steps 1–3 using the scaled data symbols. Continue repeating this procedure until no more (or very little) further peak suppression can be achieved.

Use of this peak suppression algorithm can in some cases double the efficiency of the power amplifier or equivalently double the battery life in a portable radio.

Referring once again to FIG. 5, dots 506 on the inner circle represent the magnitude of the unfiltered symbols. To avoid these symbols from overshooting all the way to the boundaries shown by the outer circle 504, they are scaled as shown by 508. As can be seen, some of the symbols are scaled down while others are scaled up in order to minimize error and peak signal magnitude.

The scaled symbols reduce the peak power demand and hence improve the amplifier efficiency. In addition, the peak-to-average power requirement of the power amplifier is reduced. This reduction is directly translated in to lower cost for the amplifier 312.

Figure 6:
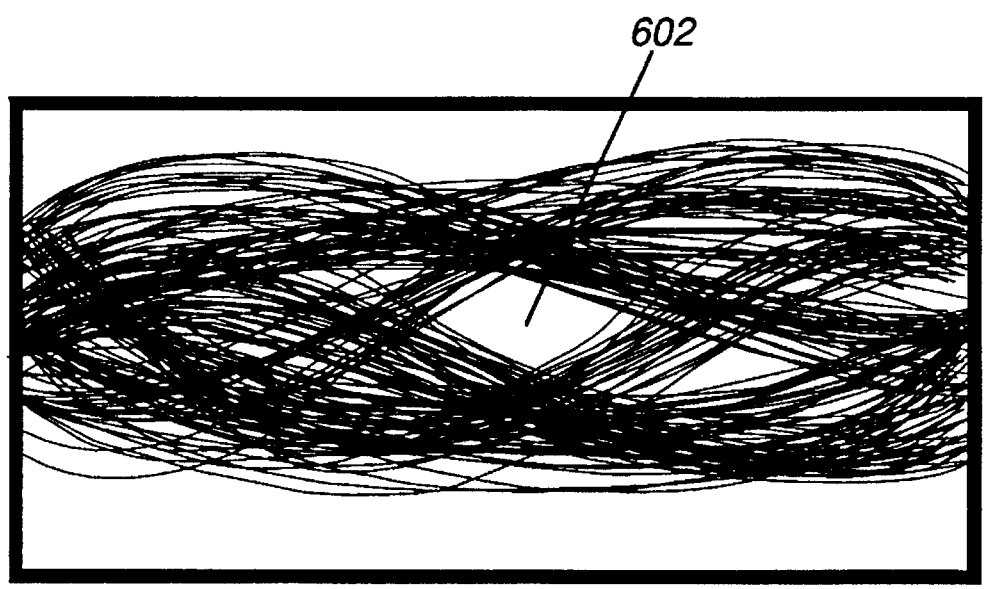
FIG. 6 shows the eye diagram of the performance of the communication device in accordance with the present invention.

The improvement in the performance of the system is accomplished with minimum impact on the accuracy of the modulation. FIG. 6 shows an eye diagram of a demodulated signal having its peaks suppressed. The eye opening 602 is shown to have a sufficiently wide opening to maintain error performance. This is highly significant as a modulation technique is only desirable when demodulation techniques available therefor are highly accurate. In addition to modulations utilizing phase or amplitude, the principles of the present invention are applicable to QAM system which utilize both the phase and the amplitude of a signal to carry information.

What is claimed is:

1. A method for modulating a digital information, comprising:

generating the digital information;

mapping the digital information onto a constellation diagram to produce data symbols each having an onset;

processing the data symbols at a rate which separates them at their respective onset via a symbol interval;

representing the data symbols in I and Q signal components; and scaling the I and Q signal components to reduce peak power while maintaining average power.

2. The method of claim 1, wherein the step of processing includes the step of filtering the I and Q signal components to maximize spectral efficiency and to produce baseband I and Q signals.

3. The method of claim 2, further including the step of determining the average power of the baseband I and Q signal.

4. The method of claim 2, further including the step of determining the instantaneous peak power of the baseband I and Q signal over each symbol interval.

5. The method of claim 4, further including the step of determining the time at which the instantaneous peak power of the baseband I and Q signal occurs on each symbol interval.

6. The method of claim 5, wherein the step of scaling includes the step of scaling the I and Q signal components utilizing the instantaneous peak power and the time at which the instantaneous peak power occurs on each symbol interval.

7. The method of claim 2, further including the step of combining the baseband I and Q signals to produce a composite baseband signal.

8. The method of claim 7, further including the step of determining the average power of the composite baseband signal.

9. The method of claim 7, further including the step of determining the peak power of the composite baseband signal at each symbol interval.

10. The method of claim 9, further including the step of determining the time at which the instantaneous peak power of the composite baseband signal occurs at each symbol interval.

11. The method of claim 10, wherein the step of scaling includes the step of scaling the I and Q signal components utilizing the instantaneous peak power and the time at which the instantaneous peak power occurs on each symbol intervals.

12. The method of claim 1, wherein the step of scaling includes altering the amplitude of the I and Q signal components equally.

13. The method of claim 1, wherein the step of scaling includes altering the amplitude of the I and Q signal components independently and unequally.

14. A digital modulator, comprising:

a digital information generator;

means for mapping the digital information onto a constellation diagram to produce data symbols each having a symbol interval;

means for representing the data symbols in I and Q signal components; and means for dynamically altering the amplitude of the I and Q signal components in order to reduce the peak-to-average power ratio.

15. The digital modulator of claim 14, wherein the means for representing includes a Digital Signal Processor (DSP).

16. The digital modulator of claim 14, further including a filter for producing baseband I and Q signals with maximum spectral efficiency.

17. The digital modulator of claim 16, further including means for determining the average power of the baseband I and Q signals.

18. The digital modulator of claim 17, wherein the means for determining includes a Digital Signal Processor (DSP).

19. The digital modulator of claim 16, further including means for determining the instantaneous peak power of the baseband I and Q signal over each symbol interval.

20. The digital modulator of claim 19, further including a timer for determining the time at which the peak power of the baseband I and Q signals occurs on each symbol interval.

21. The digital modulator of claim 16, further including a combiner for combining the baseband I and Q signals to produce a composite baseband signal.

22. A digital modulator, comprising:

a digital information generator;

means for convening the digital information into a multi-dimensional signal constellation to produce data symbols each having a magnitude and a phase; and means for forming a sphere around each data symbol within which the magnitude and the phase of the data symbol could be altered in order to minimize peak-to-average power ratio.

23. A digital modulator, comprising:

a digital information generator;

means for converting the digital information into a signal constellation having at least one dimension in order to produce data symbols each having a magnitude; and means for dynamically scaling the magnitude of the data symbols in order to avoid undesired peak power occurrences at symbol transitions and therefore minimizing the peak-to average power ratio.

24. A communication device, comprising:

a digital modulator, comprising:

a digital information generator;

means for converting the digital information into a signal constellation having at least one dimension in order to produce data symbols each having a magnitude; and means for dynamically scaling the data symbols in order to avoid undesired peak power occurrences at symbol transitions and therefore minimize peak-to-average power ratio.

an amplifier for amplifying the data symbols; and an antenna for transmitting the data symbols.

25. The communication device of claim 24, wherein the means for dynamically scaling include a DSP for scaling the magnitude of the data symbols.

\* \* \* \* \*